(12) United States Patent
Farivar et al.

(10) Patent No.: US 11,048,461 B2
(45) Date of Patent: *Jun. 29, 2021

(54) SYSTEM TO FACILITATE INTERACTION DURING A COLLABORATIVE SCREEN SHARING SESSION

(71) Applicant: Capital One Services, LLC, McLean, VA (US)

(72) Inventors: Reza Farivar, Champaign, IL (US); Austin Walters, Savoy, IL (US); Fardin Abdi Taghi Abad, Champaign, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,737

(22) Filed: Nov. 7, 2019

(65) Prior Publication Data

US 2020/0218492 A1    Jul. 9, 2020

Related U.S. Application Data

(63) Continuation of application No. 16/238,859, filed on Jan. 3, 2019, now Pat. No. 10,474,416.

(51) Int. Cl.
*G06F 3/14* (2006.01)
*H04L 29/06* (2006.01)
(Continued)

(52) U.S. Cl.
CPC .......... *G06F 3/1454* (2013.01); *G06F 3/0483* (2013.01); *G06F 9/453* (2018.02);
(Continued)

(58) Field of Classification Search
CPC ...... G06F 3/1454; G06F 9/453; G06F 3/0483; G06F 2216/15; G06F 9/452;
(Continued)

(56) References Cited

U.S. PATENT DOCUMENTS

| 10,474,416 B1 | 11/2019 | Farivar et al. |
| 2002/0065912 A1 | 5/2002 | Catchpole et al. |

(Continued)

OTHER PUBLICATIONS

Kullar P., "The Ultimate Guide to Co-browsing," Upscope, Nov. 7, 2017, 10 pages. Retrieved from Internet: [URL:https://blog.upscope.io/a-guide-to-co-browsing/].

*Primary Examiner* — Nicholas Ulrich
(74) *Attorney, Agent, or Firm* — Harrity & Harrity, LLP

(57) ABSTRACT

A server device may receive information identifying a user of a first device participating in a screen sharing session with a second device and associate the information identifying the user of the first device with information indicating a sequence of interactions with an application at the first device. The server device may determine one or more user interface elements that correspond to a current view of the application at the first device based on the sequence of interactions, and transmit, to the second device, information identifying the one or more user interface elements that correspond to the current view to permit the second device to reconstruct the current view based on the information identifying the one or more user interface elements that correspond to the current view and stored information related to a plurality of views associated with the application.

20 Claims, 10 Drawing Sheets

(51) Int. Cl.
*G06F 3/0483* (2013.01)
*H04L 29/08* (2006.01)
*G06F 9/451* (2018.01)

(52) U.S. Cl.
CPC ........ *H04L 65/1069* (2013.01); *H04L 65/403* (2013.01); *H04L 67/025* (2013.01); *H04L 67/125* (2013.01); *G06F 2216/15* (2013.01)

(58) Field of Classification Search
CPC . H04L 67/125; H04L 67/025; H04L 65/1069; H04L 65/403; H04L 67/22; H04L 65/4015; H04L 65/4007; H04L 65/00; G09G 2354/00; G09G 2350/00
See application file for complete search history.

(56) References Cited

U.S. PATENT DOCUMENTS

| | | |
|---|---|---|
| 2002/0198941 A1 | 12/2002 | Gavrilescu et al. |
| 2009/0132931 A1* | 5/2009 | Tatsubori ................ H04L 67/22 715/752 |
| 2012/0005598 A1 | 1/2012 | Burckart et al. |
| 2012/0166970 A1 | 6/2012 | Gastaldi et al. |
| 2015/0149916 A1* | 5/2015 | Mendez ................ G06F 40/14 715/738 |
| 2015/0278534 A1 | 10/2015 | Thiyagarajan et al. |
| 2018/0011678 A1* | 1/2018 | Shipper ................ G06F 3/0484 |
| 2020/0073628 A1* | 3/2020 | Fang ................ G06F 3/1454 |

* cited by examiner

SYSTEM TO FACILITATE INTERACTION DURING A COLLABORATIVE SCREEN SHARING SESSION

RELATED APPLICATION

This application is a continuation of U.S. patent application Ser. No. 16/238,859, filed Jan. 3, 2019 (now U.S. Pat. No. 10,474,416), which is incorporated herein by reference.

BACKGROUND

Screen sharing, sometimes referred to as desktop sharing, generally involves sharing access to information displayed on a local computer screen such that a remote user can see at least some of the information displayed on the local computer screen. One common use case for screen sharing is for real-time collaboration, where two or more users can simultaneously interact with a given user interface. For example, collaborative browsing (or cobrowsing) technologies allow two or more users to jointly access and navigate a given web page.

SUMMARY

According to some implementations, a method may include storing, at a server device, information related to a plurality of user interface elements associated with an application, wherein the information related to the plurality of user interface elements includes relationships among a plurality of views associated with the application. The method may include tracking, at the server device, information indicating a sequence of one or more interactions with the application at a first device, and determining, at the server device, a current view of the application at the first device based on the information indicating the sequence of one or more interactions with the application at the first device, wherein the current view of the application at the first device is determined based on the information indicating the sequence of one or more interactions with the application at the first device and the relationships among the plurality of views associated with the application. The method may include transmitting, by the server device, information identifying a subset of the plurality of user interface elements that correspond to the current view of the application at the first device to a second device to facilitate a collaborative session between the first device and the second device, wherein the information identifying the subset of the plurality of user interface elements is transmitted to permit the second device to reconstruct an anonymized version of the current view of the application at the first device based on the information identifying the subset of the plurality of user interface elements that correspond to the current view.

According to some implementations, a server device may include one or more memories, and one or more processors, communicatively coupled to the one or more memories, to host an application comprising a plurality of views, wherein each of the plurality of views includes one or more user interface elements. The one or more processors may track a sequence of one or more interactions with the application at a first device, wherein the sequence of one or more interactions represents an order in which a user of the first device navigated between the plurality of views. The one or more processors may receive information indicating that the user of the first device is participating in a screen sharing session with a second device, and may associate the screen sharing session with the sequence of one or more interactions with the application at the first device. The one or more processors may determine, within a current view of the application at the first device, an area in which the user is interacting with the application at the first device based on the sequence of one or more interactions with the application at the first device. The one or more processors may transmit, to the second device, information related to the sequence of one or more interactions associated with the screen sharing session and the area in which the user is interacting with the application at the first device to permit the second device to reconstruct the current view of the application at the first device based on stored information related to the plurality of views associated with the application.

According to some implementations, a non-transitory computer-readable medium may store instructions that include one or more instructions that, when executed by one or more processors of a server device, cause the one or more processors to receive information identifying a user of a first device participating in a screen sharing session with a second device, and to associate the information identifying the user of the first device with information indicating a sequence of one or more interactions with an application at the first device. The one or more instructions may cause the one or more processors to determine one or more user interface elements that correspond to a current view of the application at the first device based on the sequence of one or more interactions with the application at the first device. The one or more instructions may cause the one or more processors to transmit, to the second device, information identifying the one or more user interface elements that correspond to the current view of the application at the first device to permit the second device to reconstruct the current view of the application at the first device based on the information identifying the one or more user interface elements that correspond to the current view of the application at the first device and stored information related to a plurality of views associated with the application.

DETAILED DESCRIPTION

Figure 1A:
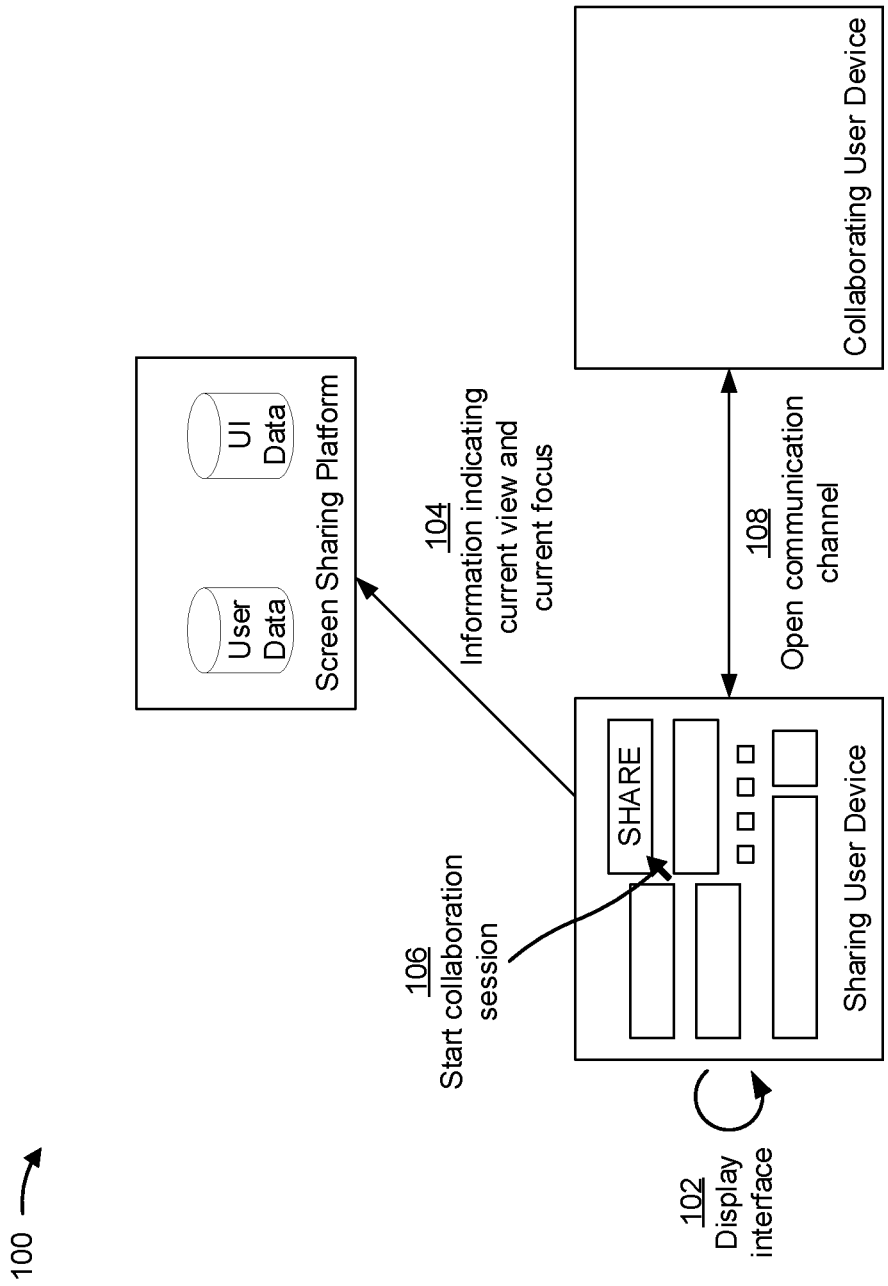
FIGS. 1A-1E are diagrams of an example implementation described herein.

The following detailed description of example implementations refers to the accompanying drawings. The same reference numbers in different drawings may identify the same or similar elements.

Screen sharing technologies have become an important information technology tool to enable users to share content displayed on their local computer screens with remote users. For example, some common screen sharing use cases include remote assistance (e.g., between a user and a customer service agent, information technology help desk, and/or the like), online training, distance learning, demonstrations, and/or the like. Screen sharing typically works by sending packets of information that represent content displayed at a sharing user device to one or more remote devices. As such, in a traditional screen sharing session, multimedia streams are used to convey screen updates, mouse clicks, keyboard events, and/or other information between endpoints over a network. This can lead to various problems and challenges, including high-bandwidth requirements, lag, network congestion, and poor visual experience, among other things. Furthermore, many screen sharing technologies are not interactive, as users instead typically need to download and install software to enable an interactive experience. Other concerns with traditional screen sharing technologies involve user privacy, as enabling a remote user to view everything shown on the sharing user's screen could expose sensitive information.

Some implementations described herein may include a screen sharing platform arranged to facilitate interaction during a collaborative screen sharing session between a first user at a sharing user device and a second user at a collaborating user device. In particular, the screen sharing platform and the collaborating user device may store information regarding a user interface design associated with an application being shared during the collaborative screen sharing session, including one or more views of the application, an arrangement of user interface elements in each of the one or more views, and how the one or more views are linked or otherwise related to one another. For example, in some implementations, the application being shared during the collaborative screen sharing session may be a website, a web application, a mobile application, a word processing application, a spreadsheet application, an email application, and/or another suitable application hosted on the screen sharing platform, and the collaborating user device may be associated with an agent that can provide customer service or assistance for a user of the application.

Accordingly, in some implementations, the screen sharing platform may be configured to track a sequence of interactions with the application at the sharing user device in substantially real-time, which may enable the screen sharing platform to determine a current view of the application at the sharing user device at any given time. For example, in some implementations, the tracked sequence of interactions may comprise clickstream data representing a series of mouse clicks, touchscreen inputs, and/or other user inputs used to navigate the application, which can be mapped to a current view of the application at the sharing user device. As such, the screen sharing platform can convey, to the collaborating user device, information identifying one or more user interface elements making up the current view of the application at the sharing device. For example, in some implementations, the one or more user interface elements may include checkboxes, dropdown lists, search fields, sliders, icons, modal windows, graphical elements, writable fields, pull-down menus, prompts, and/or the like, which may be defined according to one or more code class identifiers, code tags, code elements, and/or the like (e.g., using Hypertext Markup Language (HTML), Cascading Style Sheets (CSS), Extensible Markup Language (XML), and/or the like). Furthermore, in some implementations, the sharing user device may provide, to the screen sharing platform, information indicating a current focus of the user at the sharing user device (e.g., an HTML, CSS, XML, and/or other suitable user interface element over which the user's mouse is positioned). The screen sharing platform may transmit information relating to the current focus of the user at the sharing user device to the collaborating user device, which may permit the collaborating user device to reconstruct the current view of the application at the sharing user device, including the current focus of the user at the sharing user device.

In this way, the screen sharing platform may facilitate a collaborative screen sharing session between the first user at the sharing user device and the second user at the collaborating user device while reducing the amount of data that needs to be conveyed over a network relative to other screen sharing technologies that pass images, video, user interface elements, and/or the like between endpoint devices. In this way, the collaborative screen sharing session may have low-bandwidth requirements, which may improve performance and user experience by avoiding lag, jitter, and/or the like and by allowing the collaborative screen sharing session to operate at acceptable quality levels even in environments where a high-bandwidth connection may be unavailable. Furthermore, because the screen sharing platform and the collaborating user device have access to information regarding the user interface design associated with the application being shared during the collaborative screen sharing session, the sharing user device does not have to download any software to enable the collaborative screen sharing session. In this way, processing resources, memory resources, network resources, and/or the like may be conserved relative to other screen sharing technologies that require users to download and install software before engaging in a screen sharing session.

Further still, because the collaborating user device can reconstruct the current view of the application at the sharing user device based on information identifying the user interface elements making up the current view, the current view reconstructed at the collaborating user device can be a privatized, desensitized, and/or otherwise anonymized version of the current view at the sharing user device. For example, in some implementations, the code class identifier(s) passed to the collaborating user device (e.g., HTML, CSS, XML, and/or other suitable code class identifiers) may indicate that the current view at the sharing user device includes user interface elements corresponding to a password box, account information, and/or the like without specifying the contents of such user interface elements. In this way, the screen sharing platform may protect user privacy and offer improved information security because user-specific information is not conveyed to the collaborating user device. Furthermore, in this way, the collaborative screen sharing session may operate in substantially the same manner in the reverse direction, whereby the second user at the collaborating user device can highlight or otherwise draw attention to certain portions of the screen, navigate the application, take action(s) on behalf of the first user, and/or the like.

FIGS. 1A-1E are diagrams of an example implementation 100 described herein. For example, in implementation 100, a screen sharing platform may host one or more applications that are accessible to a first user device (hereinafter referred to as "sharing user device") that may participate in a collaborative screen sharing session with a second user device (hereinafter referred to as "collaborating user device"). For example, in some implementations, the one or more applications hosted at the screen sharing platform may comprise a web application or website accessible through a web browser, a native application (e.g., a mobile or desktop application) that can be downloaded and executed at the sharing user device, and/or the like. As such, in some implementations, the screen sharing platform may be configured to store user interface (UI) data associated with the one or more hosted applications, including one or more views associated with the one or more hosted applications, an arrangement of one or more user interface elements associated with each view, relationships among different views associated with the one or more hosted applications (e.g., a second view that may be displayed when a user selects a given user interface element in a first view), and/or the like. Furthermore, in some implementations, the screen sharing platform may be configured to store user data associated with the one or more hosted applications. For example, in some implementations, the user data may include one or more user identifiers, user tokens, cookies, digital fingerprints, and/or the like, which the screen sharing platform can map to a given view of one of the hosted applications based on the user interface data stored at the screen sharing platform.

In this way, when the sharing user device accesses a particular one of the hosted applications, the screen sharing platform can determine, based on the user data and the user interface data, a current view of the particular application. Furthermore, as described in further detail herein, the screen sharing platform may be configured to track interactions with the particular application at the sharing user device (e.g., a sequence of web clicks, touchscreen inputs, gaze tracking events, and/or the like) such that the screen sharing platform can determine a current focus of a user within the current view of the application at the sharing user device. In this way, if and/or when a collaborative screen sharing session is established between the sharing user device and the collaborating user device, the screen sharing platform can transmit, to the collaborating user device, information indicating the current view of the application at the sharing user device (e.g., information identifying one or more user interface elements displayed at the sharing user device) as well as information relating to the current focus within the current view of the application. In this way, a user at the collaborating user device may see what the user of the sharing user device sees in addition to what actions, if any, the user of the sharing user device may be taking to interact with the application.

As shown in FIG. 1A, and by reference number 102, the sharing user device may display an interface that corresponds to a particular view associated with an application hosted at the screen sharing platform. For example, in some implementations, the application may be a web application or a website such that the interface displayed at the sharing user device may include various HTML elements, CSS elements, XML elements, and/or the like. In another example, the application may be a native mobile application, a native desktop application, and/or the like, in which case the interface displayed at the sharing user device may include one or more user interface elements (e.g., design elements) that are arranged to form a particular view. In some implementations, the application may include various views (each of which include one or more user interface elements) that are organized according to one or more relationships. For example, a relationship among different views (e.g., a first view and a second view) may refer to a transition from the first view to the second view (e.g., based on a user interaction with the first view), an action that causes the transition from the first view to the second view, a hierarchical model (e.g., a Document Object Model (DOM)) used to organize the different views and/or elements of the different views, and/or the like.

As shown in FIG. 1A, and by reference number 104, the sharing user device may provide, to the screen sharing platform, information indicating a current user view at the sharing user device and/or information indicating a current user focus at the sharing user device. For example, the user data stored at the screen sharing platform may include a user identifier, a user token, a cookie, a network address, a digital fingerprint, and/or other suitable information that can be uniquely associated with a current session for the sharing user device. As a user at the sharing user device applies one or more inputs to navigate one or more views of the application (e.g., via a sequence of mouse clicks, touchscreen inputs, and/or the like), the one or more inputs may be tracked at the screen sharing platform by associating the one or more inputs with the current session for the sharing user device (e.g., as clickstream data representing an ordered path in which the user at the sharing user device navigated the one or more views of the application). Furthermore, in some implementations, the current view at the sharing user device may include one or more user interface elements configured to generate one or more events when a mouse, cursor, and/or other pointing device is positioned thereover. Additionally, or alternatively, the sharing user device may include a camera that can detect a direction of a user gaze, which can be correlated to a particular area (and thus user interface element) on the screen that corresponds to the current user focus at the sharing user device.

In some implementations, the sharing user device may be configured to stream or regularly send data to the screen sharing platform indicating coordinates associated with a current cursor position, a most recent touchscreen input, a current gaze direction, and/or the like in order to convey the current focus at the sharing user device. Additionally, or alternatively, the sharing user device may indicate only an identifier associated with a user interface element on which the user at the sharing user device is focused (e.g., a user interface element over which a mouse is positioned). In this way, by conveying only the coordinates of the current focus and/or the identifier associated with the user interface element that is the user's current focus, the sharing user device may convey the current focus using a substantially small amount of data (e.g., approximately one kilobyte per second or less) relative to other screen sharing technologies that transfer images, full or partial user interface elements, and/or the like to convey the current view and/or focus. Additionally, or alternatively, the sharing user device may convey the current user focus and/or changes to the current user focus according to one or more actions that are applied within the current view. For example, when the user at the sharing user device highlights a portion of the user interface, clicks or selects a user interface element, and/or the like, the corresponding action may be communicated to the screen sharing platform. In this way, less data may be sent to the screen sharing platform (and thus over the network) relative to streaming or regularly sending information indicating the current user focus. However, streaming or regularly sending information indicating the current user focus may provide a more accurate representation of the user's experience at the sharing user device. Accordingly, in some implementations, the amount, frequency, and/or type of data that the sharing user device sends to the screen sharing platform may be configured to balance tradeoffs among accuracy, performance, and/or the like (e.g., information indicating the current user focus may be streamed when the sharing user device has a high-bandwidth connection and/or there is a need to more accurately recreate the screen at the sharing user device, whereas only actions may be conveyed when the sharing user device has a low-bandwidth connection and/or a generalized recreation of the screen at the sharing user device would suit user needs).

Accordingly, because the screen sharing platform stores information relating to a design of the application in use at the sharing user device, the screen sharing platform can determine the current view of the application at the sharing user device (e.g., a view that is currently being output, displayed, rendered, and/or the like at the sharing user device). Furthermore, in some implementations, the screen sharing platform may determine the current view of the application based on the user data associated with the current session (e.g., based on the clickstream data when the application is a web application hosted on the screen sharing platform, based on information communicated to the screen sharing platform via one or more application program interfaces when the application is a native application having a backend implemented at the screen sharing platform, and/or the like). In this way, the screen sharing platform may determine the user interface elements that make up the current view at the sharing user device and the current focus within the current view in substantially real-time (e.g., with a small delay, a delay that is less than a threshold, such as a few milliseconds, and/or the like). For example, in some implementations, the screen sharing platform may translate information related to interactions with the application at the sharing user device into the current view and/or the current focus, which can be further correlated with the user interface elements making up the current view and the current focus. In this way, by limiting data transfer to information related to actions that change, modify, or otherwise affect the current view and/or one or more user interface elements in the current view, an amount of data transferred over a network from the sharing user device to the screen sharing platform may be reduced relative to screen sharing technologies that transfer images, full or partial user interface elements, and/or the like to convey the current view and/or focus, which may reduce network congestion and conserve processing and/or memory resources at the sharing user device and/or the screen sharing platform.

As shown in FIG. 1A, and by reference number 106, the user at the sharing user device may select an option to start a collaboration session with a remote user at the collaborating user device. For example, in some implementations, the user at the sharing user device may start the collaboration session to request support or assistance from the remote user (e.g., technical support, customer service, and/or the like), to engage in distance learning (e.g., a tutoring session or virtual classroom session), for online training, and/or any other suitable purpose. As shown in FIG. 1A, and by reference number 108, a communication channel may be opened between the sharing user device and the collaborating user device based on the sharing user device starting the collaboration session. For example, in some implementations, the communication channel may enable text-based communication between the sharing user device and the collaborating user device (e.g., in a chat window), voice-based communication between the sharing user device and the collaborating user device (e.g., via a Voice over Internet Protocol (VoIP) call, a Voice over LTE (VoLTE) call, and/or the like), video-based communication between the sharing user device and the collaborating user device, and/or the like. In this way, the user at the sharing user device and the remote user at the collaborating user device may communicate with one another regarding the interface displayed at the sharing user device.

Figure 1B:
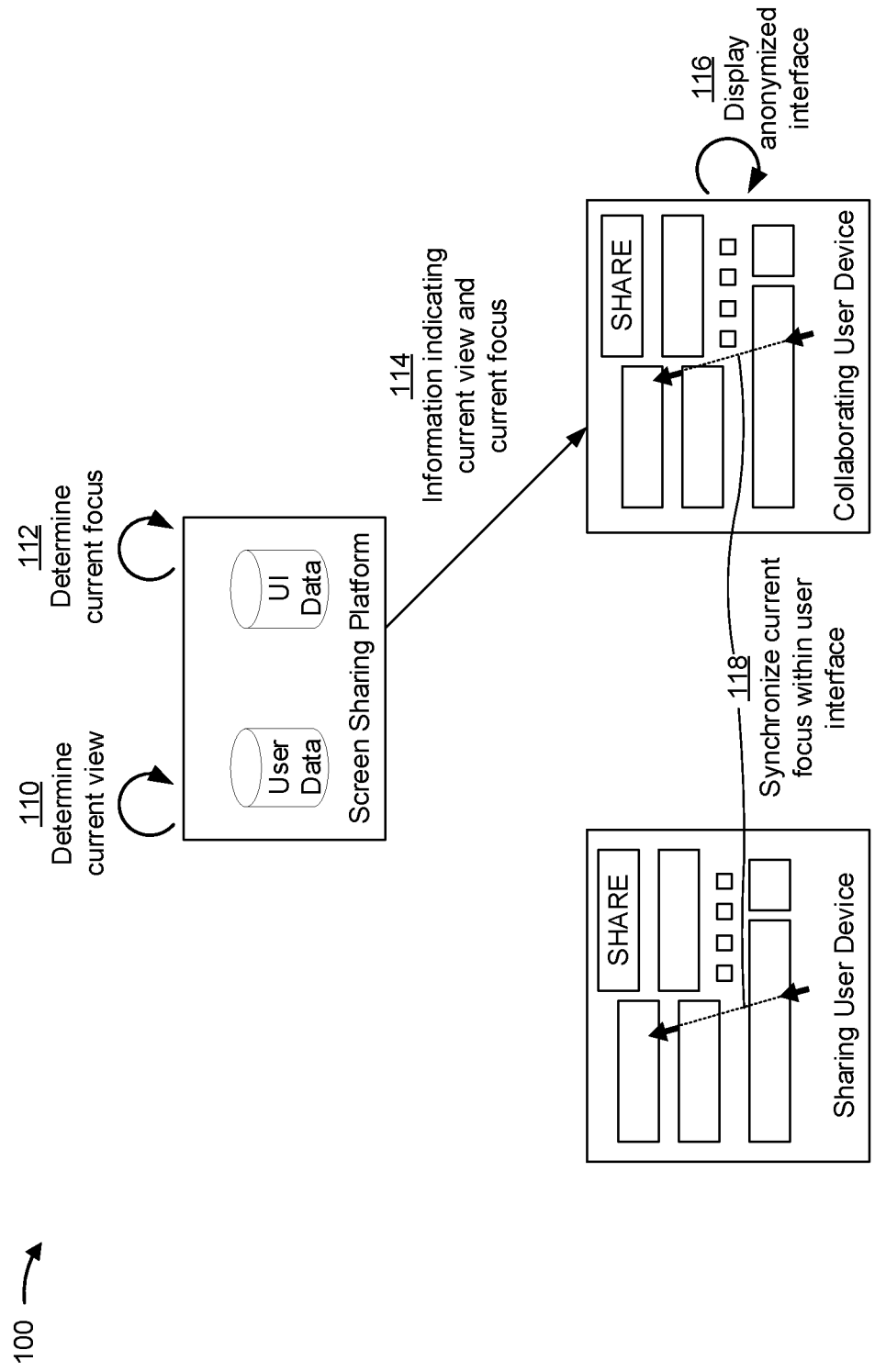

As shown in FIG. 1B, and by reference number 110, the screen sharing platform may determine the current view at the sharing user device. For example, based on the user data that relates to clickstream data, touchscreen inputs, and/or the like received from the sharing user device and the user interface data that relates to possible views of the application at the sharing user device, the screen sharing platform may determine the current view at the sharing user device from among the possible views of the application. Furthermore, in some implementations, the screen sharing platform may determine one or more identifiers that correspond to one or more user interface elements making up the current view based on the user interface data (e.g., one or more HTML, CSS, XML, and/or other suitable code class identifiers). In this way, the screen sharing platform may determine the user interface elements that make up the current view at the sharing user device without the sharing user device passing any data that may relate to user-specific data shown in such user interface elements. In this way, the screen sharing platform may determine the current view in a manner that protects privacy, information security, and/or the like for the user at the sharing user device.

As shown in FIG. 1B, and by reference number 112, the screen sharing platform may further determine the current focus within the current view at the sharing user device. For example, as noted above, one or more of the user interface elements in the current view may be configured to generate a mouseover event and/or the like when a pointing device is positioned over the corresponding user interface element. In some implementations, the mouseover event may optionally be transparent to the user, in that the interface displayed at the sharing user device may or may not activate a hover box or other graphical control element when the pointing device is positioned over the corresponding user interface element. In any case, the screen sharing platform can determine, based on the mouseover event, a current position of a mouse, cursor, or other input device at the sharing user device and thus determine the current focus at the sharing user device. In other examples, the current focus may be determined based on one or more touchscreen inputs, one or more gaze tracking events, and/or the like. For example, when a user touches a particular user interface element on a touchscreen device, moves their finger or otherwise performs a gesture against the touchscreen device, and/or the like, this information may be conveyed to the screen sharing platform, which may correlate the position and/or movement of the user's finger to a particular user interface element or area in the interface where the user is focused, as described in further detail above. In another example, the screen sharing platform may determine the particular user interface element or area in the interface where the user is focused based on a direction of a user gaze.

As shown in FIG. 1B, and by reference number 114, the screen sharing platform may convey, to the collaborating user device, information indicating the current view and the current focus at the sharing user device. For example, in some implementations, the current view may be conveyed as information that identifies the particular user interface elements that correspond to the current view of the application at the sharing user device (e.g., HTML, CSS, XML, and/or other suitable code class identifiers, code tags, and/or code elements, which may be associated with one or more checkboxes, dropdown lists, search fields, sliders, icons, modal windows, and/or the like). Furthermore, the current focus may similarly be conveyed as information that identifies the particular user interface element(s) with which the user is interacting at the sharing user device. Additionally, or alternatively, the current focus may be conveyed as absolute or relative coordinates within the current view and/or the like.

As shown in FIG. 1B, and by reference number 116, the collaborating user device may display an anonymized version of the interface displayed at the sharing user device. For example, in some implementations, the collaborating user device may have a relationship with a provider of the screen sharing platform (e.g., to provide customer support to website customers) and therefore have access to substantially the same user interface data available at the screen sharing platform. Additionally, or alternatively, the collaborating user device may obtain the user interface data (e.g., from the screen sharing platform and/or another source where the user interface data is otherwise accessible). In this way, based on the information that identifies the particular user interface elements that correspond to the current view of the application at the sharing user device, the collaborating user device may reconstruct the user interface elements that correspond to the current view of the application at the sharing user device. Furthermore, because the screen sharing platform can convey the current view according to one or more identifiers associated with the user interface elements making up the current view (e.g., rather than images of the screen at the sharing user device), the collaborating user device may not be provided with any user-specific data shown on the screen at the sharing user device. In this way, privacy and information security can be protected for the user at the sharing user device while also conveying, to the collaborating user device, the general current view visually experienced at the sharing user device.

As shown in FIG. 1B, and by reference number 118, the information indicating the current focus can be further used to synchronize the current focus between the sharing user device and the collaborating user device. In particular, based on the information received from the screen sharing platform that identifies the particular user interface element(s) and/or location within the user interface where the user is interacting at the sharing user device, the collaborating user device may display a cursor, emphasize the particular user interface element(s) and/or location within the interface where the user is interacting, and/or the like.

Accordingly, in example implementation 100, the screen sharing platform may generally reside in a path between the sharing user device and the collaborating user device. The screen sharing platform may generally have access to information relating to an entire design associated with an application in use at the sharing user device and track a sequence of interactions with the application that occur at the sharing user device. In this way, the screen sharing platform can correlate the tracked interactions to a current view of the application at the sharing user device and thus to a particular arrangement of user interface elements on the screen at the sharing user device. The tracked interactions may further provide the screen sharing platform with information to indicate the current focus of the user at the sharing user device (e.g., a cursor position, a finger location, and/or the like). In this way, the screen sharing platform can effectively determine what is on the screen at the sharing user device based on a substantially small amount of data (e.g., an amount of data needed to convey interactions that occur at the sharing user device). In some implementations, when the application is a web application hosted at the screen sharing platform, at least some of this data may be transferred over the network as part of a browsing session such that little (if any) additional data needs to be transferred from the sharing user device to the screen sharing platform to enable the screen sharing session. In this way, the screen sharing session may have a satisfactory quality of service even over slow or low-bandwidth connections. Furthermore, in this way, processing, memory, network, and/or other resources may be conserved at the sharing user device and the collaborating user device, resulting in improved user experience, which is an important factor in the acceptance of screen sharing technologies.

Figure 1C:
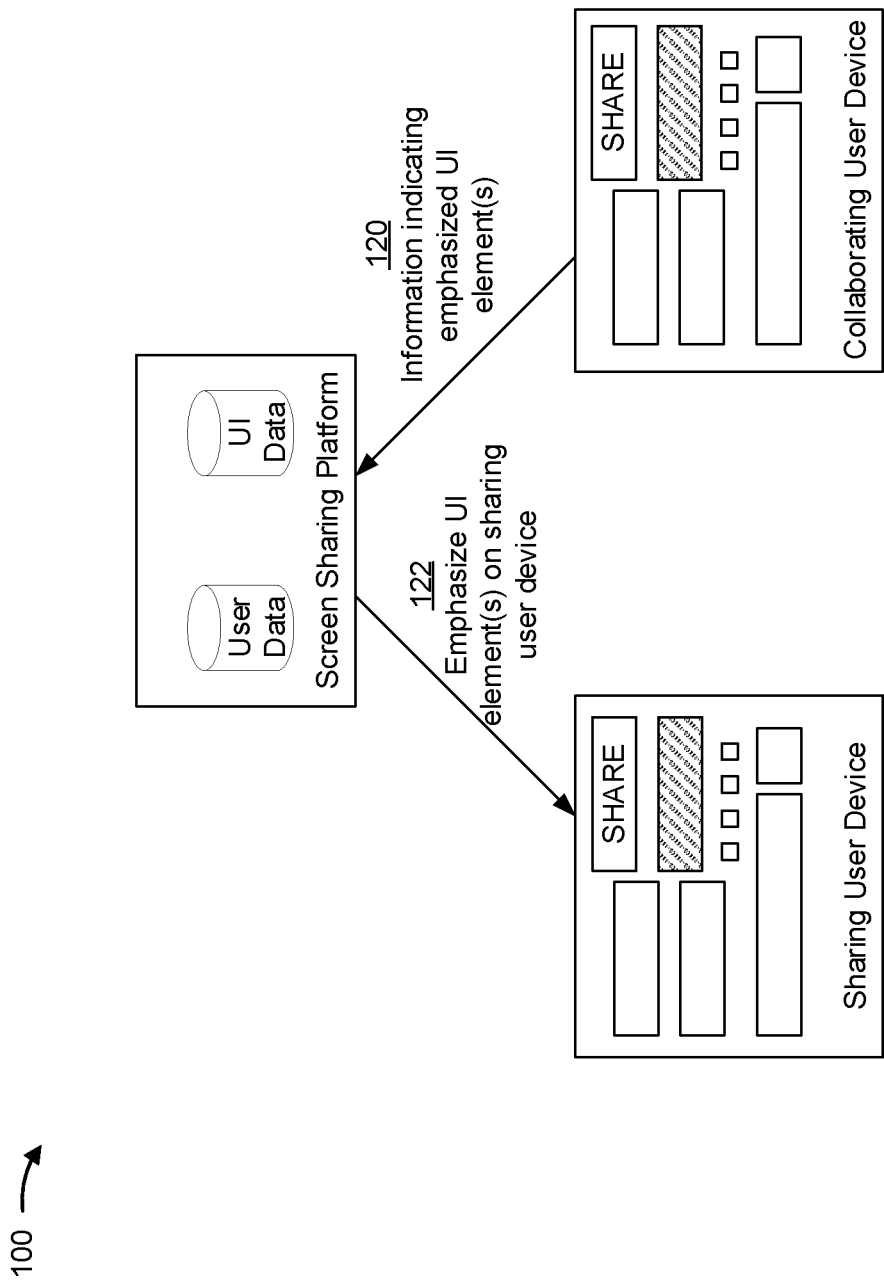

As shown in FIG. 1C, and by reference number 120, the screen sharing platform may receive, from the collaborating user device, information identifying one or more emphasized user interface elements. For example, the remote user at the collaborating user device may highlight one or more user interface elements or a portion thereof, draw a box around one or more user interface elements or a portion thereof, scroll through the anonymized interface displayed at the collaborating user device, and/or the like (e.g., shown in FIG. 1C by dashed lines). As shown in FIG. 1C, and by reference number 122, this information may be relayed to the sharing user device such that the corresponding user interface elements are emphasized within the current view at the sharing user device. In this way, the remote user at the collaborating user device may draw attention to certain user interface elements to more effectively communicate during the screen sharing session. In this way, the user at the sharing user device and the user at the collaborating user device may arrive at a mutual understanding in a shorter time, which may conserve network resources by reducing the amount of time that data is communicated over the network to support the screen sharing session. While operations are described herein as facilitating screen sharing whereby user interface elements emphasized at the collaborating user device are emphasized within the current view at the sharing user device, similar operations can be performed to facilitate screen sharing whereby user interface elements emphasized at the sharing user device are emphasized within the current view at the collaborating user device.

Figure 1D:
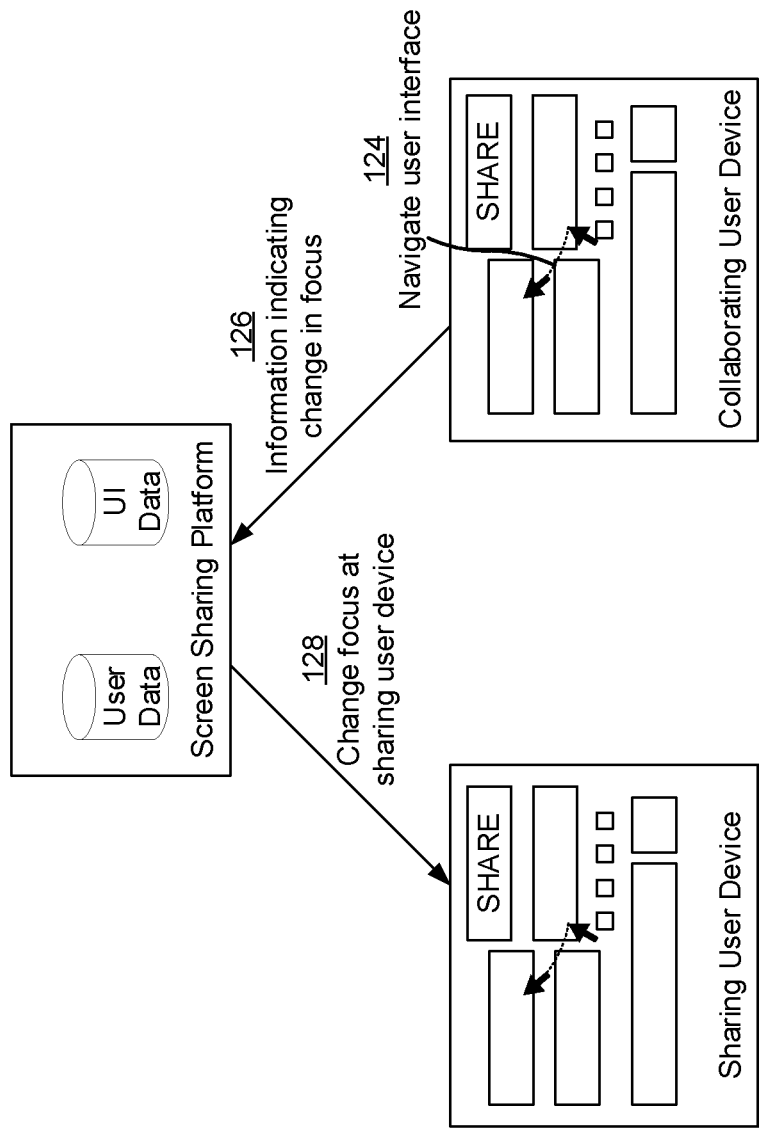

As shown in FIG. 1D, and by reference number 124, the remote user at the collaborating user device may further take control of the application and navigate the user interface. For example, suppose that the user at the sharing user device has established the screen sharing session to request support or assistance from the remote user at the collaborating user device. While discussing an issue facing the user at the sharing user device, the remote user may notice that the cursor at the sharing user device is positioned over a user interface element that is unrelated to the issue facing the user at the sharing user device. In this example, the remote user can take control of the pointing device and navigate to the correct user interface element. As shown in FIG. 1D, and by reference number 126, information indicating a change in focus based on the remote user navigating the user interface can be communicated to the screen sharing platform. For example, the change in focus can be communicated according to changes to a cursor position and/or the like. As shown in FIG. 1D, and by reference number 128, the screen sharing platform can communicate, to the sharing user device, information to cause the change of focus to be reflected at the sharing user device. Furthermore, while operations are described herein as causing a change in focus applied at the collaborating user device to be reflected at the sharing user device, similar operations can be performed to cause a change in focus applied at the sharing user device to be reflected at the collaborating user device. In this way, the remote user at the collaborating user device and the user at the sharing user device can each navigate the user interface and see changes in focus that are applied at the other device.

Figure 1E:
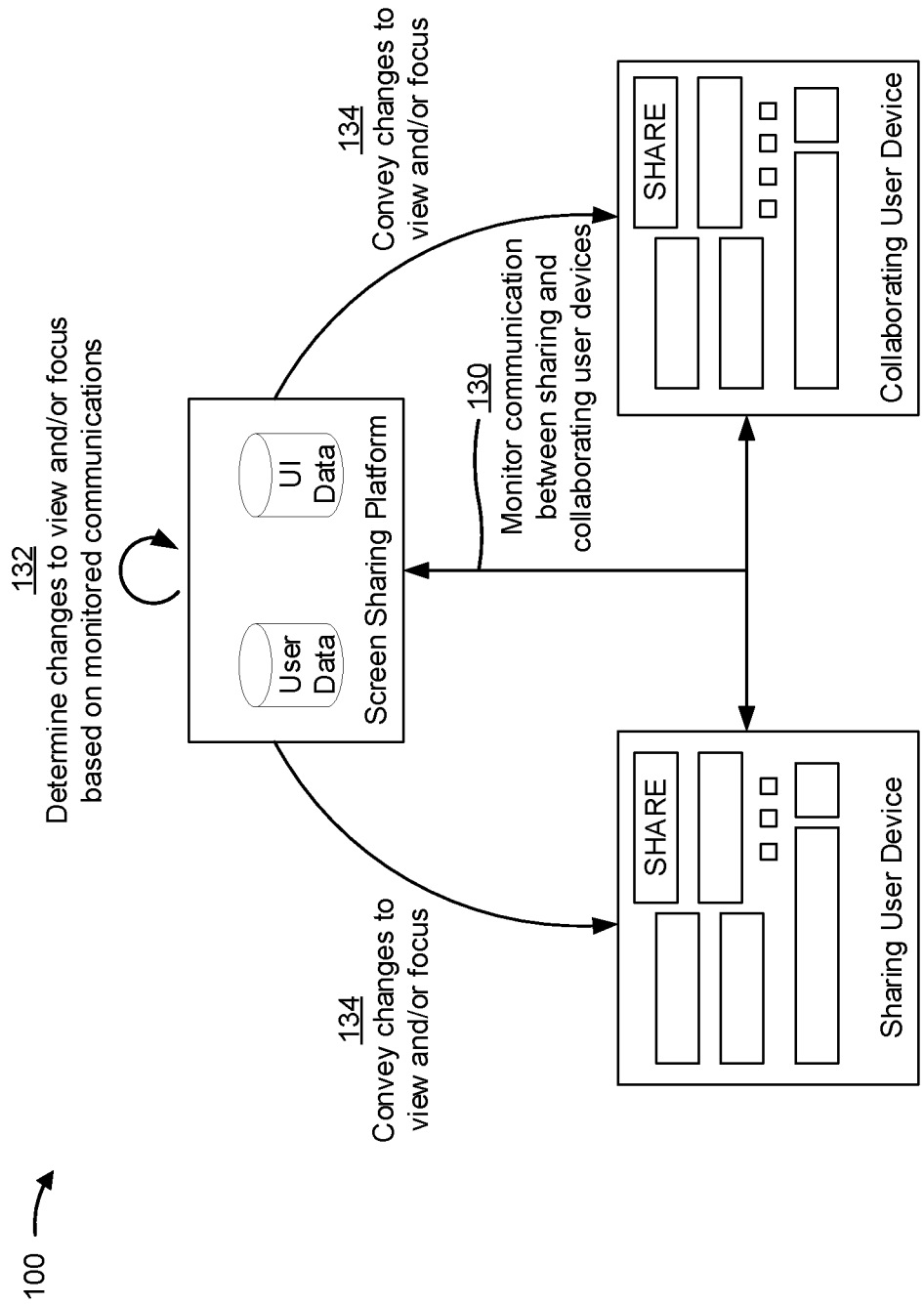

As shown in FIG. 1E, and by reference number 130, the screen sharing platform may be further configured to monitor the communication channel between the sharing user device and the collaborating device. For example, in some implementations, text, voice, and/or other suitable data communicated between the sharing user device and the collaborating user device may be used to determine a context of interactions that are occurring at the sharing user device and/or the collaborating user device. Accordingly, as shown in FIG. 1E, and by reference number 132, the screen sharing platform may determine one or more changes to the current view and/or the current focus at one or more of the sharing user device or the collaborating user device based on the monitored communications. For example, the monitored communications may include one or more words or phrases that are relevant to the current view and/or the current focus (e.g., the user at the sharing user device may be requesting help regarding a particular user interface element and the remote user may say "Look at the green box in the upper left of the screen.").

In some implementations, communications between the sharing user device and the collaborating user device may therefore be captured at the screen sharing platform and used to determine the one or more changes to the current view and/or focus. For example, when the communication channel between the sharing user device and the collaborating user device is a voice-based communication channel, the screen sharing platform may capture utterances communicated via the communication channel, convert the utterances into text and/or another suitable data format, and subjected to natural language processing to determine what was said and how what was said relates to information displayed within the current view of the application. Additionally, or alternatively, text communicated between the sharing user device and the collaborating user device may be processed into a format that can be subjected to natural language processing to similarly determine what was communicated and how that communication relates to information displayed within the current view of the application.

In some implementations, the screen sharing platform may translate a result from the natural language processing (e.g., what was communicated and/or a relevance to certain information displayed on the screen) into one or more actions that are configured to draw attention to one or more user interface elements relevant to the natural language processing result. For example, as shown in FIG. 1E, and by reference number 134, the screen sharing platform may generate one or more actions to emphasize certain user interface elements and/or portions thereof, which may be conveyed to the sharing user device and the collaborating user device to cause the sharing user device and the collaborating user device to emphasize such user interface elements and/or portions thereof (e.g., highlighting or otherwise emphasizing the green box in the upper left of the screen).

As indicated above, FIGS. 1A-1E are provided merely as one or more examples. Other examples may differ from what is described with regard to FIGS. 1A-1E.

Figure 2:
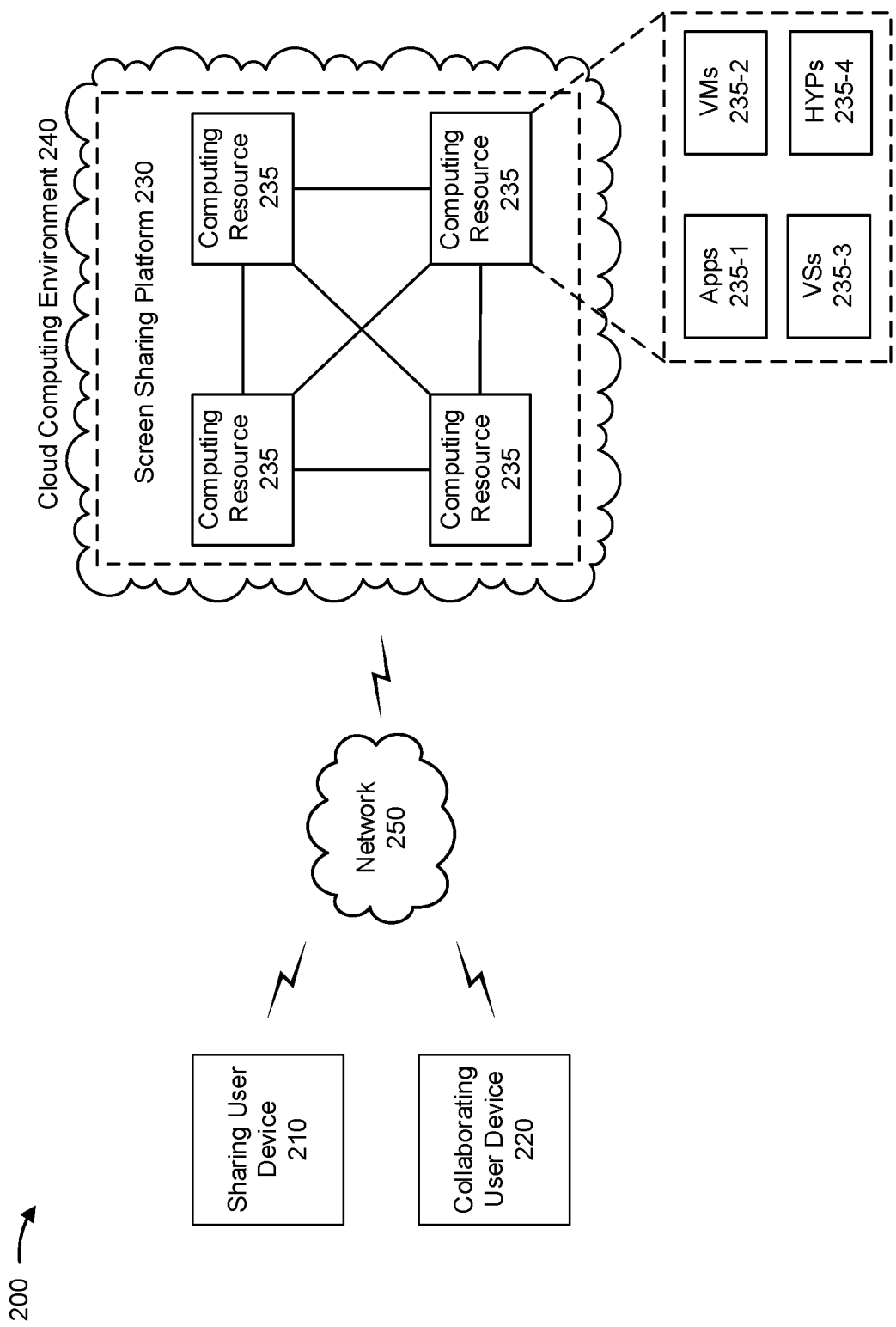
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a sharing user device 210, a collaborating user device 220, a screen sharing platform 230, a cloud computing environment 240, and a network 250. Devices of environment 200 may interconnect via wired connections, wireless connections, or a combination of wired and wireless connections.

Sharing user device 210 includes one or more devices capable of receiving, generating, storing, processing, and/or providing information associated with sharing access to information with collaborating user device 220. For example, sharing user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Collaborating user device 220 includes one or more devices capable of receiving, generating, storing, processing, and/or providing information associated with accessing information shared by sharing user device 210. For example, collaborating user device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Screen sharing platform 230 includes one or more computing resources assigned to facilitate interaction during a screen sharing session between sharing user device 210 and collaborating user device 220. For example, screen sharing platform 230 may be a platform implemented by cloud computing environment 240 that may receive information indicating a current view and current focus from sharing user device 210, provide information indicating a current view and current focus to collaborating user device 220, receive information indicating emphasized user interface elements from collaborating user device 220, emphasize user interface elements on sharing user device 210, receive information indicating a change in focus from collaborating user device 220, change a focus at sharing user device 210, monitor communication between sharing user device 210 and collaborating user device 220, and determine and convey, to sharing user device 210 and collaborating user device 220, changes to view and/or focus based on the monitored communications. In some implementations, screen sharing platform 230 is implemented by computing resources 235 of cloud computing environment 240.

Screen sharing platform 230 may include a server device or a group of server devices. In some implementations, screen sharing platform 230 may be hosted in cloud computing environment 240. Notably, while implementations described herein describe screen sharing platform 230 as being hosted in cloud computing environment 240, in some implementations, screen sharing platform 230 may be non-cloud-based or may be partially cloud-based.

Cloud computing environment 240 includes an environment that delivers computing as a service, whereby shared resources, services, etc. may be provided to sharing user device 210, collaborating user device 220, and/or the like. Cloud computing environment 240 may provide computation, software, data access, storage, and/or other services that do not require end-user knowledge of a physical location and configuration of a system and/or a device that delivers the services. As shown, cloud computing environment 240 may include screen sharing platform 230 and computing resource 235.

Computing resource 235 includes one or more personal computers, workstation computers, server devices, or another type of computation and/or communication device. In some implementations, computing resource 235 may host screen sharing platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications (e.g., Software-as-a-Service (SaaS) applications) that may be provided to or accessed by user device 210 and/or 220. Application 235-1 may eliminate a need to install and execute the software applications on user device 210 and/or 220. For example, application 235-1 may include software associated with screen sharing platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., user device 210 and/or 220), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
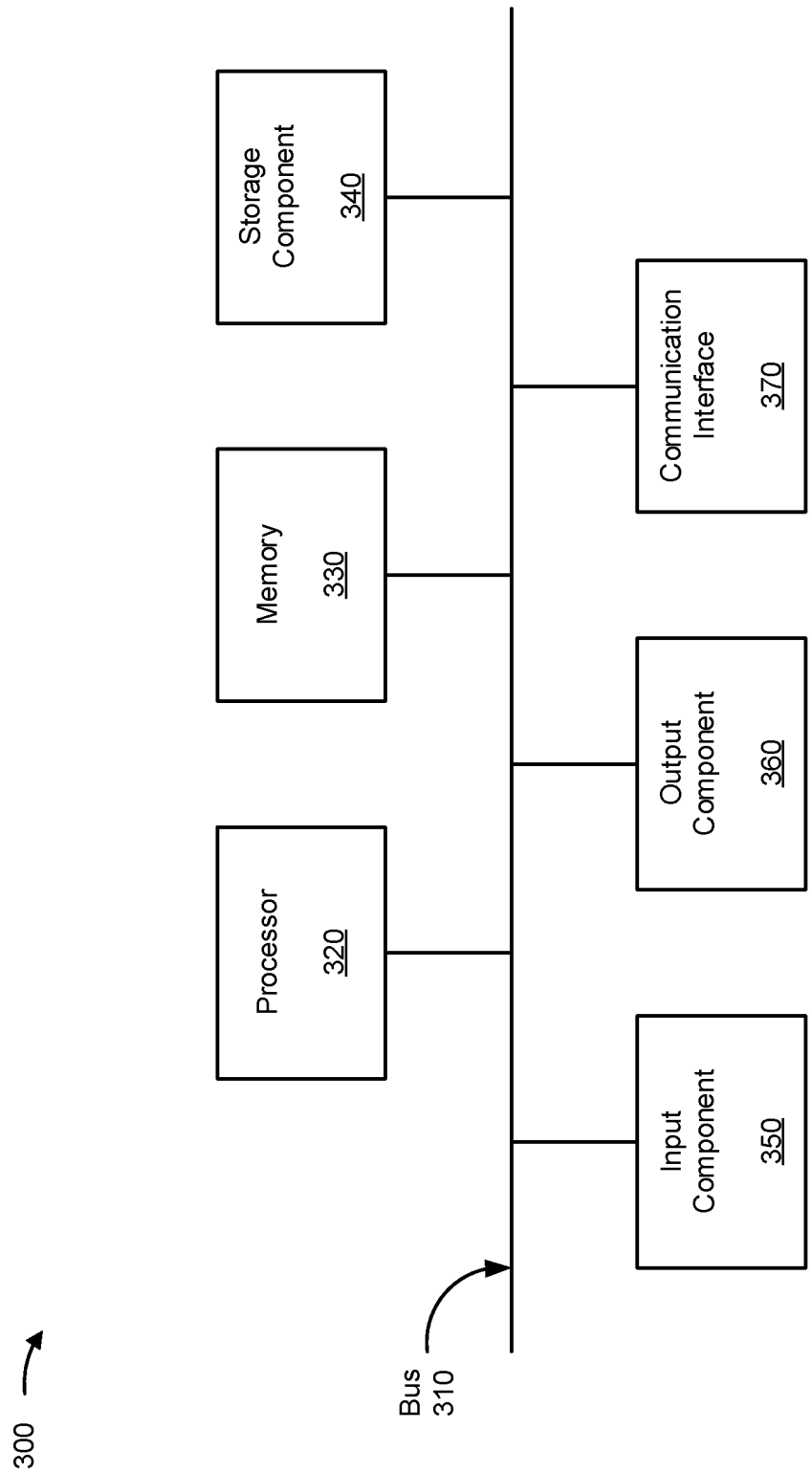
FIG. 3 is a diagram of example components of one or more devices of FIG. 2.

FIG. 3 is a diagram of example components of a device 300. Device 300 may correspond to sharing user device 210, collaborating user device 220, screen sharing platform 230, and/or computing resource 235. In some implementations, sharing user device 210, collaborating user device 220, screen sharing platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300 (e.g., a wireline communication link, a wireless communication link, and/or a combination thereof). Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
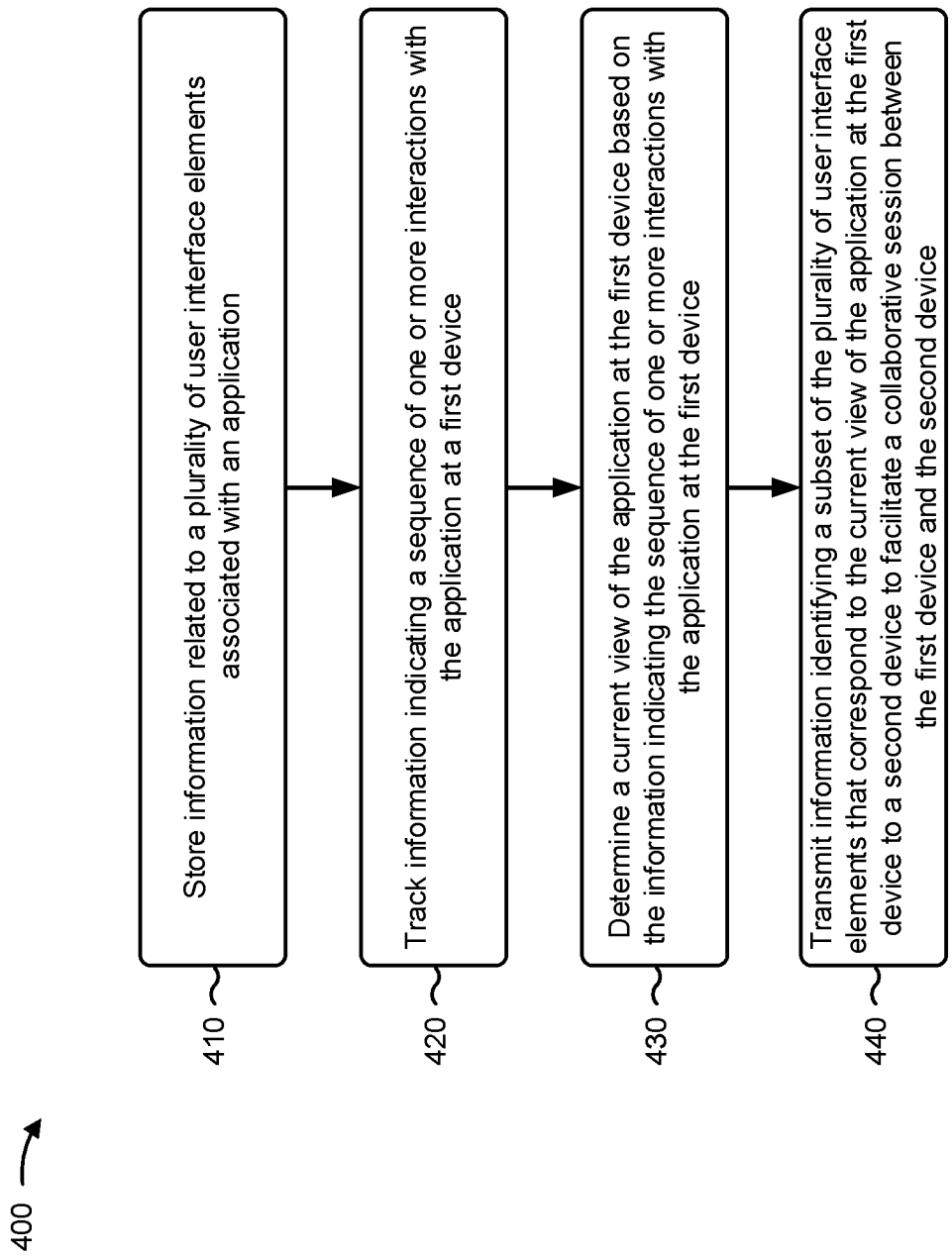
FIG. 4 is a flow chart of an example process for facilitating interaction during a collaborative screen sharing session.

FIG. 4 is a flow chart of an example process 400 for facilitating interaction during a collaborative screen sharing session. In some implementations, one or more process blocks of FIG. 4 may be performed by a server device, such as a screen sharing platform (e.g., screen sharing platform 230). In some implementations, one or more process blocks of FIG. 4 may be performed by another device or a group of devices separate from or including a screen sharing platform (e.g., screen sharing platform 230), such as a sharing user device (e.g., sharing user device 210), a collaborating user device (e.g., collaborating user device 220), and a computing resource (e.g., computing resource 235).

As shown in FIG. 4, process 400 may include storing information related to a plurality of user interface elements associated with an application (block 410). For example, the screen sharing platform (e.g., using computing resource 235, processor 320, memory 330, storage component 340, and/or the like) may store information related to a plurality of user interface elements associated with an application, as described above. In some implementations, the information related to the plurality of user interface elements may include relationships among a plurality of views associated with the application.

As further shown in FIG. 4, process 400 may include tracking information indicating a sequence of one or more interactions with the application at a first device (block 420). For example, the screen sharing platform (e.g., using computing resource 235, processor 320, memory 330, storage component 340, input component 350, communication interface 370, and/or the like) may track information indicating a sequence of one or more interactions with the application at a first device, as described above.

As further shown in FIG. 4, process 400 may include determining a current view of the application at the first device based on the information indicating the sequence of one or more interactions with the application at the first device, wherein the current view of the application at the first device is determined based on the information indicating the sequence of one or more interactions with the application at the first device and the relationships among the plurality of views associated with the application (block 430). For example, the screen sharing platform (e.g., using computing resource 235, processor 320, memory 330, storage component 340, and/or the like) may determine a current view of the application at the first device based on the information indicating the sequence of one or more interactions with the application at the first device, as described above. In some implementations, the current view of the application at the first device may be determined based on the information indicating the sequence of one or more interactions with the application at the first device and the relationships among the plurality of views associated with the application.

As further shown in FIG. 4, process 400 may include transmitting information identifying a subset of the plurality of user interface elements that correspond to the current view of the application at the first device to a second device to facilitate a collaborative session between the first device and the second device (block 440). For example, the screen sharing platform (e.g., using computing resource 235, processor 320, memory 330, storage component 340, output component 360, communication interface 370, and/or the like) may transmit information identifying a subset of the plurality of user interface elements that correspond to the current view of the application at the first device to a second device to facilitate a collaborative session between the first device and the second device, as described above. In some implementations, the information identifying the subset of the plurality of user interface elements may be transmitted to permit the second device to reconstruct an anonymized version of the current view of the application at the first device based on the information identifying the subset of the plurality of user interface elements that correspond to the current view.

Process 400 may include additional implementations, such as any single implementation or any combination of implementations described below and/or in connection with one or more other processes described elsewhere herein.

In some implementations, the information indicating the sequence of one or more interactions may represent an ordered path in which a user at the first device navigated one or more of the plurality of views associated with the application. In some implementations, the screen sharing platform may determine a current focus within the current view of the application at the first device, and may transmit information indicating the current focus within the current view of the application to the second device, where the information indicating the current focus places a visual emphasis on at least one user interface element, of the subset of the plurality of user interface elements, that corresponds to the current focus in the current view reconstructed at the second device.

In some implementations, the information indicating the current focus within the current view of the application may include one or more mouseover events, one or more touchscreen inputs, or one or more gaze tracking events focused on the at least one user interface element. In some implementations, the screen sharing platform may receive, from the second device, information indicating a change to the current focus within the anonymized version of the current view of the application at the second device, and may transmit, to the first device, information to synchronize the change to the current focus within the current view of the application at the first device.

In some implementations, the information indicating the change to the current focus may indicate a visual emphasis to be applied within the current view of the application at the first device. In some implementations, when determining the current focus within the current view of the application at the first device, the screen sharing platform may monitor communications between the first device and the second device and may determine that a context of the communications between the first device and the second device relate to the at least one user interface element.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
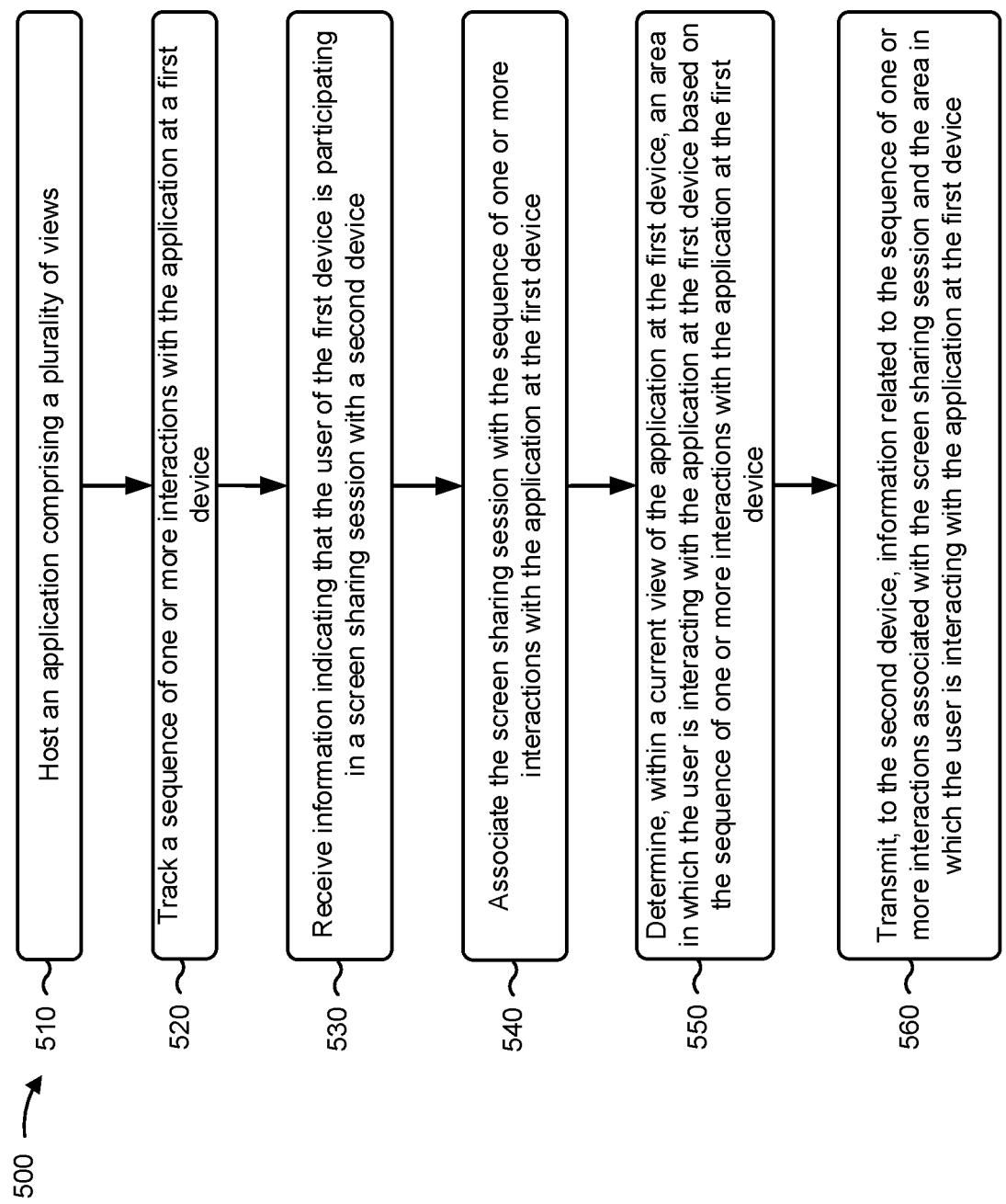
FIG. 5 is a flow chart of an example process for facilitating interaction during a collaborative screen sharing session.

FIG. 5 is a flow chart of an example process 500 for facilitating interaction during a collaborative screen sharing session. In some implementations, one or more process blocks of FIG. 5 may be performed by a server device, such as a screen sharing platform (e.g., screen sharing platform 230). In some implementations, one or more process blocks of FIG. 5 may be performed by another device or a group of devices separate from or including a screen sharing platform (e.g., screen sharing platform 230), such as a sharing user device (e.g., sharing user device 210), a collaborating user device (e.g., collaborating user device 220), and a computing resource (e.g., computing resource 235).

As shown in FIG. 5, process 500 may include hosting an application comprising a plurality of views (block 510). For example, the screen sharing platform (e.g., using computing resource 235, processor 320, memory 330, storage component 340, input component 350, output component 360, communication interface 370, and/or the like) may host an application comprising a plurality of views, as described above. In some implementations, each of the plurality of views may include one or more user interface elements.

As further shown in FIG. 5, process 500 may include tracking a sequence of one or more interactions with the application at a first device (block 520). For example, the screen sharing platform (e.g., using computing resource 235, processor 320, memory 330, storage component 340, input component 350, communication interface 370, and/or the like) may track a sequence of one or more interactions with the application at a first device, as described above. In some implementations, the sequence of one or more interactions may represent an order in which a user of the first device navigated between the plurality of views.

As further shown in FIG. 5, process 500 may include receiving information indicating that the user of the first device is participating in a screen sharing session with a second device (block 530). For example, the screen sharing platform (e.g., using computing resource 235, processor 320, memory 330, storage component 340, input component 350, communication interface 370, and/or the like) may receive information indicating that the user of the first device is participating in a screen sharing session with a second device, as described above.

As further shown in FIG. 5, process 500 may include associating the screen sharing session with the sequence of one or more interactions with the application at the first device (block 540). For example, the screen sharing platform (e.g., using computing resource 235, processor 320, memory 330, storage component 340, input component 350, communication interface 370, and/or the like) may associate the screen sharing session with the sequence of one or more interactions with the application at the first device, as described above.

As further shown in FIG. 5, process 500 may include determining, within a current view of the application at the first device, an area in which the user is interacting with the application at the first device based on the sequence of one or more interactions with the application at the first device (block 550). For example, the screen sharing platform (e.g., using computing resource 235, processor 320, memory 330, storage component 340, and/or the like) may determine, within a current view of the application at the first device, an area in which the user is interacting with the application at the first device based on the sequence of one or more interactions with the application at the first device, as described above.

As further shown in FIG. 5, process 500 may include transmitting, to the second device, information related to the sequence of one or more interactions associated with the screen sharing session and the area in which the user is interacting with the application at the first device to permit the second device to reconstruct the current view of the application at the first device based on stored information related to the plurality of views associated with the application (block 560). For example, the screen sharing platform (e.g., using computing resource 235, processor 320, memory 330, storage component 340, output component 360, communication interface 370, and/or the like) may transmit, to the second device, information related to the sequence of one or more interactions associated with the screen sharing session and the area in which the user is interacting with the application at the first device to permit the second device to reconstruct the current view of the application at the first device based on stored information related to the plurality of views associated with the application, as described above.

Process 500 may include additional implementations, such as any single implementation or any combination of implementations described below and/or in connection with one or more other processes described elsewhere herein.

In some implementations, when tracking the sequence of one or more interactions with the application at the first device, the screen sharing platform may associate the sequence of one or more interactions with a digital fingerprint that uniquely corresponds to the first device, where the digital fingerprint is used to associate the screen sharing session with the sequence of one or more interactions with the application at the first device.

In some implementations, the information transmitted to the second device may cause the second device to visually emphasize the area in which the user is interacting with the application at the first device. In some implementations, the screen sharing platform may determine the area in which the user is interacting with the application at the first device based on a position of a cursor at the first device.

In some implementations, the screen sharing platform may receive, from the second device, information to control the application at the first device, where the information to control the application at the first device indicates a change to the position of the cursor, and may transmit, to the first device, information to synchronize the change to the position of the cursor at the first device. In some implementations, the information transmitted to the first device may cause the first device to visually emphasize the change to the position of the cursor.

In some implementations, the screen sharing platform may monitor a communication channel between the first device and the second device, may identify one or more words or phrases contained in text or voice data exchanged over the communication channel, and may determine the area in which the user is interacting with the application at the first device based on the one or more words or phrases.

In some implementations, the screen sharing platform may identify, within the current view of the application at the first device, private data associated with the user of the first device, where the information transmitted to the second device indicates the current view of the application at the first device in a manner that anonymizes the private data associated with the user of the first device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
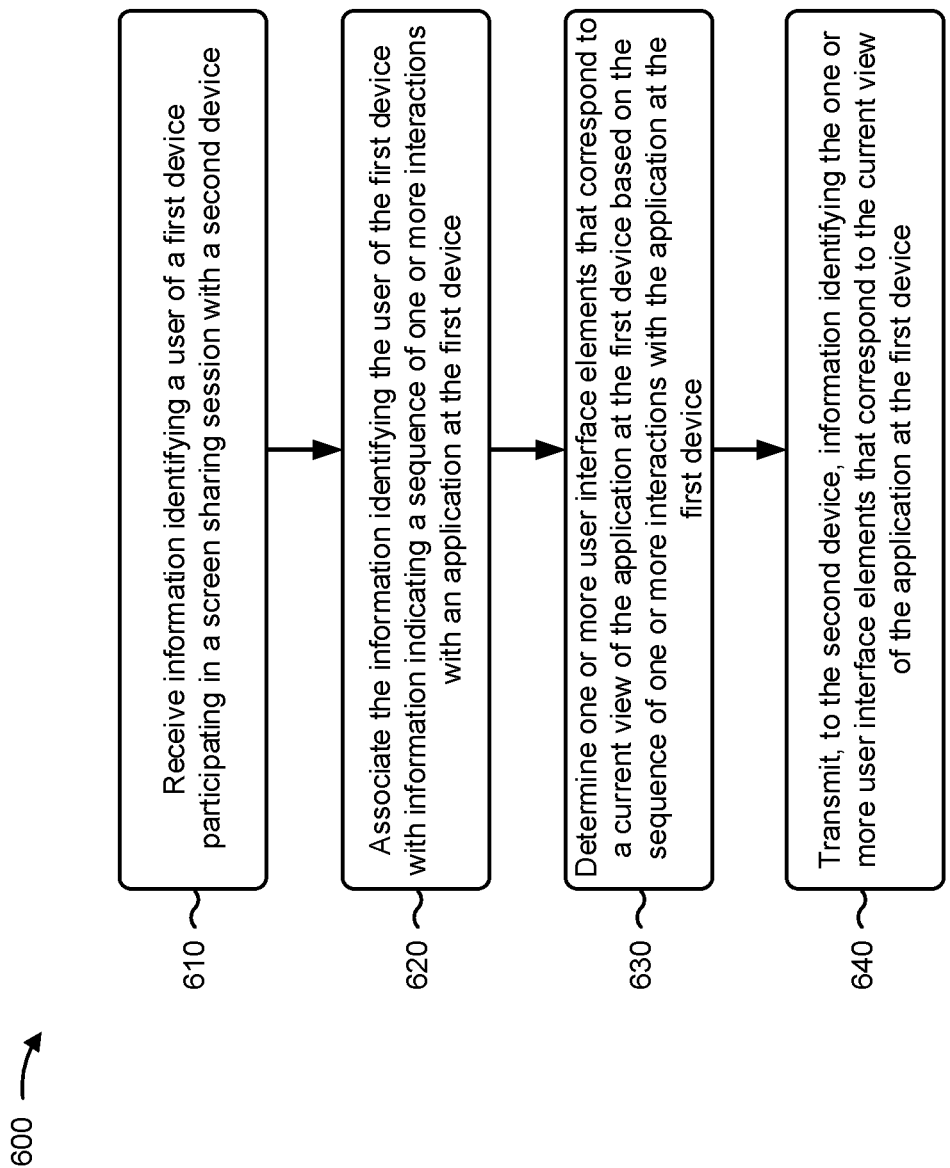
FIG. 6 is a flow chart of an example process for facilitating interaction during a collaborative screen sharing session.

FIG. 6 is a flow chart of an example process 600 for facilitating interaction during a collaborative screen sharing session. In some implementations, one or more process blocks of FIG. 6 may be performed by a server device, such as a screen sharing platform (e.g., screen sharing platform 230). In some implementations, one or more process blocks of FIG. 6 may be performed by another device or a group of devices separate from or including a screen sharing platform (e.g., screen sharing platform 230), such as a sharing user device (e.g., sharing user device 210), a collaborating user device (e.g., collaborating user device 220), and a computing resource (e.g., computing resource 235).

As shown in FIG. 6, process 600 may include receiving information identifying a user of a first device participating in a screen sharing session with a second device (block 610). For example, the screen sharing platform (e.g., using computing resource 235, processor 320, memory 330, storage component 340, input component 350, communication interface 370, and/or the like) may receive information identifying a user of a first device participating in a screen sharing session with a second device, as described above.

As further shown in FIG. 6, process 600 may include associating the information identifying the user of the first device with information indicating a sequence of one or more interactions with an application at the first device (block 620). For example, the screen sharing platform (e.g., using computing resource 235, processor 320, memory 330, storage component 340, input component 350, communication interface 370, and/or the like) may associate the information identifying the user of the first device with information indicating a sequence of one or more interactions with an application at the first device, as described above.

As further shown in FIG. 6, process 600 may include determining one or more user interface elements that correspond to a current view of the application at the first device based on the sequence of one or more interactions with the application at the first device (block 630). For example, the screen sharing platform (e.g., using computing resource 235, processor 320, memory 330, storage component 340, and/or the like) may determine one or more user interface elements that correspond to a current view of the application at the first device based on the sequence of one or more interactions with the application at the first device, as described above.

As further shown in FIG. 6, process 600 may include transmitting, to the second device, information identifying the one or more user interface elements that correspond to the current view of the application at the first device to permit the second device to reconstruct the current view of the application at the first device based on the information identifying the one or more user interface elements that correspond to the current view of the application at the first device and stored information related to a plurality of views associated with the application (block 640). For example, the screen sharing platform (e.g., using computing resource 235, processor 320, memory 330, storage component 340, output component 360, communication interface 370, and/or the like) may transmit, to the second device, information identifying the one or more user interface elements that correspond to the current view of the application at the first device to permit the second device to reconstruct the current view of the application at the first device based on the information identifying the one or more user interface elements that correspond to the current view of the application at the first device and stored information related to a plurality of views associated with the application, as described above.

Process 600 may include additional implementations, such as any single implementation or any combination of implementations described below and/or in connection with one or more other processes described elsewhere herein.

In some implementations, the information indicating the sequence of one or more interactions may include clickstream data representing an ordered path in which the user of the first device navigated one or more views of the application. In some implementations, the information indicating the sequence of one or more interactions may represent one or more touchscreen inputs used to navigate one or more views of the application at the first device. In some implementations, the information transmitted to the second device may anonymize data that relates to the user of the first device.

In some implementations, the screen sharing platform may monitor a communication channel between the first device and the second device, may determine an area in which the user is interacting with the application at the first device based on one or more words or phrases exchanged via the communication channel, and may transmit, to the second device, information identifying the area in which the user is interacting with the application at the first device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    monitoring, by a device, communications between a first device and a second device;
    determining, by the device, that a context of the communications relates to at least one user interface element of an application associated with the first device and the second device,
        wherein determining that the context of the communications relates to the at least one user interface element comprises:
            performing natural language processing on the communications; and
            determining, based on a result of the natural language processing, that the context of the communications relates to the at least one user interface element; and
    transmitting, by the device, based on determining that the context of the communications relates to the at least one user interface element, and to at least one of the first device or the second device, information indicating the at least one user interface element,
        wherein the information indicating the at least one user interface element places a visual emphasis on the at least one user interface element.

2. The method of claim 1, wherein:
    the application is operating on the first device; and
    wherein the method further comprises:
        providing, to the second device, data defining the at least one user interface element,
            the data defining the at least one user interface element causing the second device to reconstruct the at least one user interface element to create a view of the application.

3. The method of claim 2, wherein the data defining the at least one user interface element comprises computer application code.

4. The method of claim 1, wherein the communications comprise at least one of:
    voice communications, or
    text communications.

5. The method of claim 1, further comprising:
    receiving, from the first device, data indicating a current view of the application; and
    transmitting, to the second device, data that causes the second device to reconstruct an anonymized version of the current view of the application.

6. The method of claim 1, further comprising:
    identifying an arrangement of a plurality of user interface elements associated with the application; and
    transmitting, to the second device, data indicating the arrangement,
    the data indicating the arrangement causing the second device to display the arrangement.

7. The method of claim 1, further comprising:
    determining a current focus, for at least one of the first device or the second device, based on:
        one or more mouseover events,
        one or more touchscreen inputs, or
        one or more gaze tracking events; and
    providing, to the first device or the second device, information identifying the current focus.

8. A device, comprising:
    one or more memories; and
    one or more processors communicatively coupled to the one or more memories, configured to:
    monitor communications between a first device and a second device;
    determine that a context of the communications relates to at least one user interface element of an application associated with the first device and the second device,
        wherein the one or more processors, when determining that the context of the communications relates to the at least one user interface element, are configured to:
            perform natural language processing on the communications; and determine, based on a result of the natural language processing, that the context of the communications relates to the at least one user interface element; and transmit, based on the determination that the context of the communications relates to the at least one user interface element and to at least one of the first device or the second device, information indicating the at least one user interface element, wherein the information indicating the at least one user interface element places a visual emphasis on the at least one user interface element.

9. The device of claim 8, wherein:

the application is operating on the first device; and wherein the one or more processors are further configured to:

provide, to the second device, data defining the at least one user interface element, the data defining the at least one user interface element causing the second device to reconstruct the at least one user interface element to create a view of the application.

10. The device of claim 9, wherein the data defining the at least one user interface element comprises computer application code.

11. The device of claim 8, wherein the communications comprise at least one of:

voice communications, or text communications.

12. The device of claim 8, wherein the one or more processors are further configured to:

receive, from the first device, data indicating a current view of the application; and transmit, to the second device, data that causes the second device to reconstruct an anonymized version of the current view of the application.

13. The device of claim 8, wherein the one or more processors are further configured to:

identify an arrangement of a plurality of user interface elements associated with the application; and transmit, to the second device, data indicating the arrangement, the data indicating the arrangement causing the second device to display the arrangement.

14. The device of claim 8, wherein the one or more processors are further configured to:

determine a current focus, for at least one of the first device or the second device, based on:

one or more mouseover events, one or more touchscreen inputs, or one or more gaze tracking events; and provide, to the first device or the second device, information identifying the current focus.

15. A non-transitory computer-readable medium storing instructions, the instructions comprising:

one or more instructions that, when executed by one or more processors, cause the one or more processors to:

monitor communications between a first device and a second device;

determine that a context of the communications relates to at least one user interface element of an application associated with the first device and the second device, wherein the one or more instructions, that cause the one or more processors to determine that the context of the communications relates to the at least one user interface element, cause the one or more processors to:

perform natural language processing on the communications; and determine, based on a result of the natural language processing, that the context of the communications relates to the at least one user interface element; and transmit, based on the determination that the context of the communications relates to the at least one user interface element and to at least one of the first device or the second device, information indicating the at least one user interface element, wherein the information indicating the at least one user interface element places a visual emphasis on the at least one user interface element.

16. The non-transitory computer-readable medium of claim 15, wherein:

the application is operating on the first device; and wherein the one or more instructions, when executed by the one or more processors, further cause the one or more processors to:

provide, to the second device, data defining the at least one user interface element, the data defining the at least one user interface element causing the second device to reconstruct the at least one user interface element to create a view of the application.

17. The non-transitory computer-readable medium of claim 16, wherein the data defining the at least one user interface element comprises computer application code.

18. The non-transitory computer-readable medium of claim 15, wherein the communications comprise at least one of:

voice communications, or text communications.

19. The non-transitory computer-readable medium of claim 15, wherein the one or more instructions, when executed by the one or more processors, further cause the one or more processors to:

receive, from the first device, data indicating a current view of the application; and transmit, to the second device, data that causes the second device to reconstruct an anonymized version of the current view of the application.

20. The non-transitory computer-readable medium of claim 15, wherein the one or more instructions, when executed by the one or more processors, further cause the one or more processors to:

identify an arrangement of a plurality of user interface elements associated with the application; and transmit, to the second device, data indicating the arrangement, the data indicating the arrangement causing the second device to display the arrangement.

* * * * *